(12) United States Patent
Wurster et al.

(10) Patent No.: US 10,496,598 B2
(45) Date of Patent: Dec. 3, 2019

(54) DATA ACCESS CONTROL BASED ON STORAGE VALIDATION

(71) Applicant: BlackBerry Limited, Waterloo (CA)

(72) Inventors: Glenn Daniel Wurster, Kitchener (CA); David Legault, Gatineau (CA)

(73) Assignee: BlackBerry Limited, Waterloo, Ontario (CA)

( * ) Notice: Subject to any disclaimer, the term of this patent is extended or adjusted under 35 U.S.C. 154(b) by 703 days.

(21) Appl. No.: 14/868,759

(22) Filed: Sep. 29, 2015

(65) Prior Publication Data

US 2017/0091182 A1 Mar. 30, 2017

(51) Int. Cl.
| | | |
|---|---|---|
| G06F 7/00 | (2006.01) | |
| G06F 17/30 | (2006.01) | |
| G06F 16/11 | (2019.01) | |
| G06F 16/182 | (2019.01) | |
| H04L 29/06 | (2006.01) | |
| G06F 21/60 | (2013.01) | |
| G06F 21/62 | (2013.01) | |

(52) U.S. Cl.
CPC .......... *G06F 16/11* (2019.01); *G06F 16/182* (2019.01); *G06F 21/604* (2013.01); *G06F 21/6218* (2013.01); *H04L 63/10* (2013.01)

(58) Field of Classification Search
CPC .................................................................
G06F 17/3007; G06F 17/30194; H04L 63/10
USPC ......................................................... 707/783
See application file for complete search history.

(56) References Cited

U.S. PATENT DOCUMENTS

| | | | | |
|---|---|---|---|---|
| 6,971,018 B1 * | 11/2005 | Witt | .................. | G06F 21/52 705/57 |
| 8,161,012 B1 * | 4/2012 | Gerraty | .................. | G06F 21/53 707/687 |
| 8,346,926 B1 * | 1/2013 | Van Riel | ............. | G06F 21/6218 707/781 |
| 8,832,455 B1 * | 9/2014 | Drewry | ................. | G06F 21/575 713/187 |
| 2003/0028508 A1 * | 2/2003 | Quinlan | .................. | G06F 21/31 |
| 2006/0015939 A1 * | 1/2006 | Aston | ..................... | G06F 21/52 726/22 |

(Continued)

OTHER PUBLICATIONS

Extended European Search Report dated Feb. 8, 2016, received for European Application No. 15195732.1.
Corbet, J., "dm-verity", https://lwn.net/Articles/459420/, Sep. 19, 2011, pp. 1-5.
Internet Archive, "Chapter 11 Managing and Mounting Files in Trusted Extensions (Tasks)", http://web.archive.org/web/20150920081230/http://docs.oracle.com/cd/E19253-01/819-0872/managefiles-1/index.html, last visited on Jan. 21, 2016, pp. 1-10.

(Continued)

*Primary Examiner* — Binh V Ho
(74) *Attorney, Agent, or Firm* — Jeffrey N. Giunta; Fleit Intellectual Property Law

(57) ABSTRACT

A system and method to control access to data are disclosed. A command to mount a specified file system as a trusted file system is received. Whether the specified file system is marked as a trustable file system is determined, where marking as a trustable file system based on verifying integrity protection for the specified file system. The specified file system is mounted as a trusted file system based on determining that the specified file system is marked as a trustable file system. A command to access data on the specified file system is received. A determination is made as to whether the specified file system was mounted with a specification to be a trusted file system. Access to the data is permitted or denied based on determining that the mounting specified mounting as a trusted file system.

20 Claims, 7 Drawing Sheets

(56) References Cited

U.S. PATENT DOCUMENTS

| | | | |
|---|---|---|---|
| 2006/0031269 A1* | 2/2006 | Gislason | G06F 16/10 |
| 2006/0053182 A1* | 3/2006 | Sen | G06F 11/1448 |
| 2006/0200473 A1* | 9/2006 | Whitehead, Jr. | G06F 16/10 |
| 2009/0271858 A1* | 10/2009 | Cooke | H04L 63/105 726/12 |
| 2010/0117873 A1* | 5/2010 | Aciicmez | H03M 7/30 341/51 |
| 2011/0113231 A1* | 5/2011 | Kaminsky | G06F 21/575 713/2 |
| 2012/0016839 A1* | 1/2012 | Yueh | G06F 11/1435 707/624 |
| 2012/0054490 A1* | 3/2012 | Rosu | H04W 4/60 713/165 |
| 2013/0311990 A1* | 11/2013 | Tang | G06F 9/45558 718/1 |
| 2013/0333049 A1* | 12/2013 | Cheng | G06F 21/6245 726/26 |
| 2014/0025713 A1* | 1/2014 | Avati | G06F 16/182 707/827 |
| 2014/0281571 A1* | 9/2014 | Federspiel | G06F 21/6209 713/189 |
| 2014/0325644 A1* | 10/2014 | Oberg | G06F 21/57 726/22 |
| 2016/0092701 A1* | 3/2016 | Shah | G06F 21/64 713/189 |
| 2016/0224404 A1* | 8/2016 | Mehta | G06F 11/0793 |

OTHER PUBLICATIONS

Corbet, J., "Filesystem mounts in user namespaces", https://lwn.net/Articles/652468/, Jul. 29, 2015, pp. 1-8.

Ancincova, B., "Red Hat Enterprise Linux 6 Security-Enhanced Linux User Guide", 2012-2015, pp. 1-82.

Red Hat Enterprise Linux 4: Red Hat SELinux Guide, Chapter 2. SELinux Policy Overview, pp. 1-4.

Examination Report pursuant to Article 94(3) EPC issued for European patent application No. 15195732.1 dated Jan. 7, 2019.

Anonymous: "File System Security Contexts", Red Hat Enterprise Linux 4: Red Hat SELinux Guide, Chapter 2. SE Linux Policy Overview, 2.4. File System Security Contexts, retrieved from the Internet: URL:https://access.redhat.com/documentation/en-US/Red_Hat_Enterprise_Linus/4/html/SELinux_Guide/rhlcommon-section-0019.html, retrieved on Jan. 22, 2016.

Corbet, Jonathan, "dm-verity", LWM.net, Sep. 19, 2011, XP055242815, retrieved from the Internet: URL:https://lwn.net/Articles/459420, retrieved on Jan. 19, 2016.

Ancinocova, Barbora, "Red Hat Enterprise Linux 6 Security-Enhanced Linux", Jul. 9, 2015, XP055243734, retrieved from the Internet: URL:https://access.redhat.com/documentation/en-US/Red_Hat_Enterprise_Linux/6/pdf/Security-Enhanced_Linux/Red_Hat_enterprise_Linux-6-Security-Enhanced_Linux-en-US.pdf, retrieved Jan. 21, 2016. Jul. 9, 2015.

* cited by examiner

300

| NAME | ALLOWABLE TRUSTED OPERATIONS |
|---|---|
| FILE SYSTEM A ~320 | ALL ~322 |
| FILE SYSTEM B ~330 | NONE ~332 |
| FILE SYSTEM C ~340 | LIST OF ALLOWABLE OPERATIONS ~342 |

FIG. 3

DATA ACCESS CONTROL BASED ON STORAGE VALIDATION

FIELD OF THE DISCLOSURE

The present disclosure generally relates to restricting the execution privileges of application programs, and more particularly to controlling execution privileges based on validation of the data storage storing the application program.

BACKGROUND

Computing devices of all types, from large computers to portable computing devices, embedded controllers of all types, and processing devices of all sizes, often include a set of program applications that are able to perform various functions that are not generally allowed by most applications or user accounts. The operating systems of these computing devices often include definitions of execution "privileges" or "capabilities" where some application programs or other executable processes are able to execute with an elevated privilege or are granted access to one or more operations that are associated with a normally restricted "capability." These application programs or processes are thereby identified as being able to perform various functions that are not authorized for other applications. In some examples, the data storage used to store applications is able to store information that identifies the maximum privilege level at which an application is able to execute or the capabilities granted to that application.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates a file system list, according to an example;

DETAILED DESCRIPTION

Figure 1:
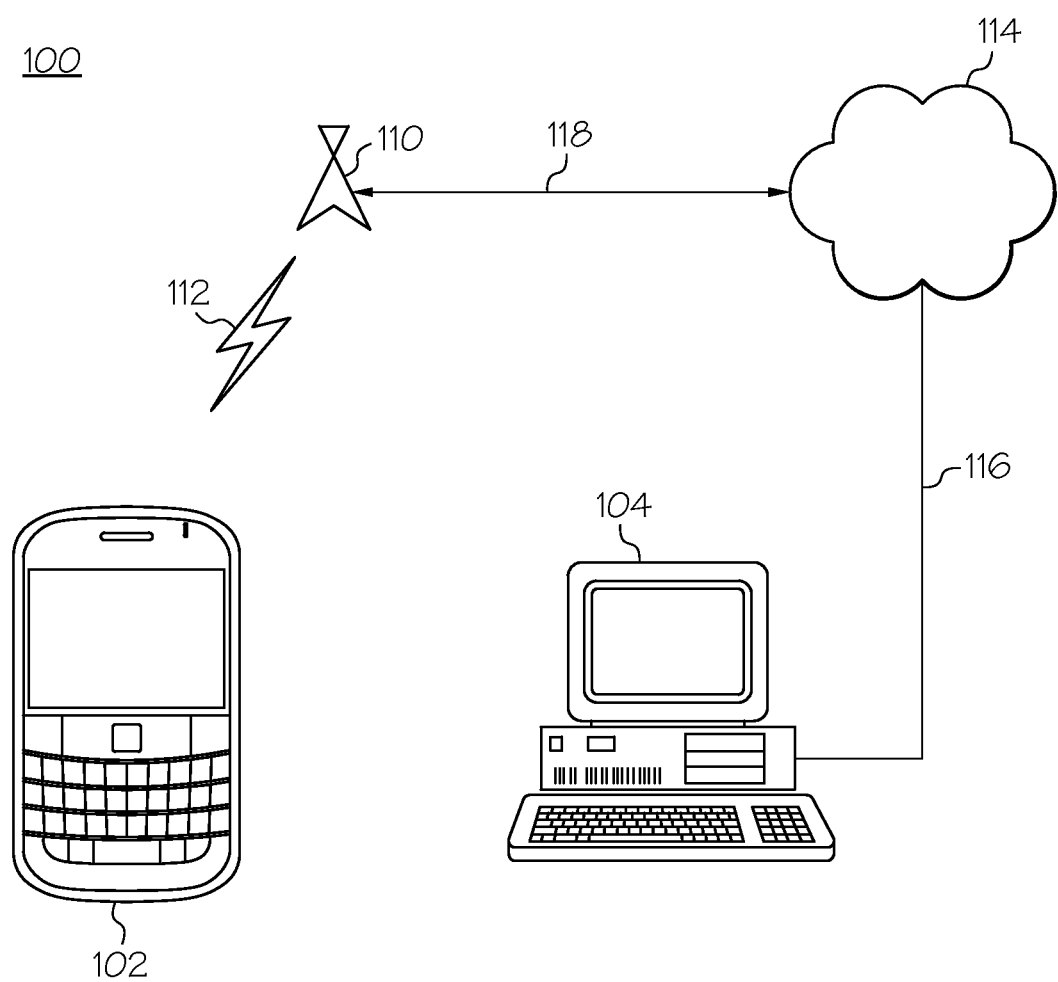
FIG. 1 illustrates a computing environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

In some computing systems, performing certain operations is limited to processes or users who are specifically authorized to perform one or more of those operations. In some computing systems, certain accounts are specified as having elevated privileges, such as a "superuser" or "root" accounts in various operating systems. Some computer systems define one or more "capabilities" that specify types of operations or actions a particular executable file or user is able to perform. In this description, the term "privilege" is used expansively to refer to any ability to perform one or more operation or other activity that is restricted to some processes on a device. The term elevated privilege refers to an ability to perform these operations or activities that are normally restricted. In general, a process executing with elevated privilege includes, but is not limited to, any operating system privileges, capabilities defined for some processes as is described below, any other ability, or combinations of these that are not available to all processes operating on a processor or system. An executable file that has one or more specified capability is able to perform the actions or operations associated with that capability. In general, such capabilities are associated with modifying or controlling operations of a computer's operating system or controlling sensitive operating aspects of a device, such as disabling privilege checks, modifying file system access limitations, performing system administration operations, any other sensitive or restricted operations, or combinations of these.

Controlling access in some computer systems is implemented by a user or administrator specifying an access control label or other indicator for individual files that controls the accessibility of each of those files to specific applications running on the system. In an example, these access control labels specify the allowable privileges or capabilities for the file associated with that label. This labelling approach is effective when the underlying filesystem is trusted to properly store and maintain those access control labels and the files to which they pertain. The effectiveness of this control mechanism is sometimes limited in devices where unauthorized modification of the data storage is possible such that labels or data files can be changed to allow unauthorized programs to operate with elevated privileges.

Some computer systems are able to ensure the data integrity of data storage elements, such as a file system on a block storage device, to determine if there have been any unauthorized modifications to the stored data. Examples of unauthorized modifications of data include modifying access control labels on a file that would give a user additional privileges, modifying labels in order to attempt to force a trusted application to execute by using harmful data that is unauthorized for processing with elevated privileges or capabilities and that may have been provided by an unauthorized user where the unauthorized data may reside on an untrusted file-system, other modifications, or combinations of these. In some examples, applications or data associated with execution at elevated privileges are stored in data storage elements that provide integrity protection for stored data. Data integrity protection provided by some computer systems prevents changes to the file-system from going undetected. As long as no change is detected, such computer systems allow the execution of privileged processes associated with data contained on data storage that has data integrity protection.

Various techniques are able to be used to provide data integrity on data storage. These techniques generally include processing to ensure that data stored on the file system has not been altered by an unauthorized process. In an example, integrity protection is provided by maintaining hash values for previously stored data that are able to be compared to hash values for currently stored data. Integrity protection schemes generally provide a technique to indicate, or verify, that integrity protection is being provided for the file system. When a file system is first processed by a processor, an integrity layer is able to be set up for that file system by verifying that the integrity protection system is providing integrity protection for that file system.

Data integrity protection is able to be provided for many types of storage elements. For example, a block storage device is able to include one or more file systems that are each able to independently provide integrity protection. In some examples, one or more partitions or other data groups are able to be created on a data storage device, such as solid state memory, mechanical data storage devices, any data storage devices, or combinations of these. One or more file systems are then able to be established on a data storage partition. In the following description, the term file system is used to generally refer to any data storage group that stores data of any form, including but not limited to, data files, executable programs scripts, applications, or the like, access control labels for other data stored on the same or different file system, other data, or combinations of these. The term file system as used herein is not limited to any particular construct. For example, a file system may refer to one block device, one partition, or a single storage structure, although a file system may include multiple block devices, multiple partitions, multiple storage structures, or combinations of these, and multiple file systems are able to reside on one block device, one partition, or a single storage structure.

Some electronic devices are able to store or modify data stored on file systems in their normal modes of operations. For example, some electronic devices are able to store configuration settings, photos, videos, and even downloaded applications at various times while those devices are operating. Configuration settings, photos, videos, other data, or combinations of these, are able to be created, modified, otherwise altered, or combinations of these, in some electronic devices by certain unprivileged processes, such as processes associated with regular user accounts. These unprivileged processes are generally not suitable for operations at elevated privileges which might allow changes to important aspects of the electronic device's operation. In general, user-generated or user-downloaded files are not able to be stored on an integrity protected file-system. In such computing systems, some data storage partitions are integrity protected and their access control labels can be trusted, while other data storage partitions on the same device are not integrity protected and hence files on those data storage partitions should not be granted elevated privileges based on their access control labels, whether or not those access control labels are stored on the same data storage partition or on a partition that does provide integrity protection.

A process executing on a device that has some file systems that provide data integrity protection and other file systems that do not provide integrity protection generally has no easy method to identify if a particular file originates from an integrity protected file system or not. In such a configuration, a privileged application may, for example, mistakenly treat a file that is not on an integrity protected file system as having data integrity protection and thus rely on that file's labels to determine privileges or capabilities. In such a scenario, an application or data that is stored on a file system that does not provide data integrity protection may be executed at, or used by an application with, elevated privileges or capabilities.

The below described systems and methods describe computing systems that provide facilities that efficiently allow processes and applications, including user-space applications, to identify whether or not the contents of a file can be trusted for use or execution by processes with elevated privileges. These systems and methods allow, for example, an operating system kernel to automatically reject an attempt to use various techniques that are used to cause a computing device to use unauthorized files in conjunction with operations at elevated privilege levels. These examples provide the ability to determine the integrity of a file system without developer effort or code modification to the user-space applications.

In an example, the below described systems and methods provide a process to mount a specified file system, where the file system mounting process supports a specifiable option to mount the file system as a "trusted" file system. In the following discussion, this option is referred to as a "trusted file system option." Prior to attempting to mount a trusted file system, such as at a time when a system is first starting (e.g., booting) or when a device with a file system is first presented to the system, the integrity protection of file system is verified in some examples. The success or failure of verifying the integrity protection of a particular file system is stored as a trustable file system indicator for that file system within a database of trustable file systems. In an example, the database of trustable file systems is maintained in volatile memory and is not persisted across events such as the device restarting, rebooting, or other similar events. The trustable file system indicators stored in the database of trustable file systems indicate that the integrity protection of the respective file systems has been verified, thereby allowing efficient confirmation of the integrity protection of the file system and allowing reliance on the integrity of the labels and files stored on that file system.

Setting up integrity protection for a file system includes, in an example, verifying the integrity protection for the file system is in place. In an example, verification of the specified file system is performed by the operating system kernel of the device, which verifies that the file system is integrity protected. In an example, integrity protection of the file system is provided by using systems such as dm-verity or similar approaches. In some examples, file system integrity may be provided by the operation of the file system itself. The integrity protection is able to be verified in an example by determining that the system performing the integrity protection is operating on the file system and indicates that that the integrity of the file system is being maintained.

Specifying the trusted file system option when executing the file system mounting process for a specified file system causes the file system mounting process to determine if the specified file system is marked as a trustable file system in the database of trustable file systems that is maintained in volatile memory. In an example, the database of trustable file systems stores a trustable file system indicator for each file system for which integrity protection has been verified. If the specified file system is marked as a trustable file system, the file system mounting process honors the trusted file system option and proceeds with processing to mount the specified file system as a trusted file system. Mounting a file system as a trusted file system is also able to be subject to other conditions imposed by other considerations, such as system privilege restrictions, and the like. Because the integrity protection of the file system has been verified prior to an ability to successfully mount the file system as a trusted file system, the contents of the file system are better assured to be unmodified and therefore can be trusted for purposes of executing processes with elevated permissions or capabilities. If the file system mounting process has the trusted file system option specified but the database of trustable file systems does not indicate that integrity protection of the specified file system has been verified, then the request to mount the specified file system as a trusted file system in one example is denied. In further examples, other processing may occur such as mounting the specified file system as though the trusted file system option was not specified. File system mounting requests that do not specify the trusted file system option are performed in one example without examination of the database of trustable file systems.

In an example, when data on a file system is to be used to support access to elevated privileges, the status of the file system as being mounted as a trusted file system is able to be used as a condition to use labels stored on and associated with files on that file system, other privilege information on that file system, data or executable applications stored on that file system, or combinations of these, to control access to or perform privileged or otherwise restricted operations. A mounted file system's status as a trusted file system is able to be indicated by any suitable technique. In an example, the operating system stores the mounting options that were specified when each file system was mounted, and the operating system is able to examine these stored mounting options to determine whether or not the mounting command for a particular file system specified the trusted file system option.

In general, the integrity layer for a file system is able to be set up at any time that the processor is operating. In order to successfully mount a file system with the trusted file system option specified in one example, the integrity protection for that file system is set up, and the trustable file system indicator in the database of trustable file systems reflects that the integrity protection has been set up prior to executing that mount request. An attempt to mount a file system with the trusted file system option specified but before the integrity protection for the file system has been verified, and thus there is no indicator that it is a trustable file system, generally results in a denial to mount the file system as a trusted file system.

When a file system in one example is successfully mounted by a process with the option specifying that the file system is a trusted file system, application binaries stored on that specified file system with labels indicating authorization for elevated privileges, capabilities, or both, are able to execute with the capabilities, privileges, or both, specified by those labels. In an example, when an application attempts to perform defined operations that require elevated privileges, the operating system checks to see if the file system containing the file that is being accessed was mounted with a command specifying that the file system is to be mounted as a trusted file system. If the file system was mounted by a command specifying mounting the file system as a trusted file system, the operation is allowed to proceed. If the mount command did not specify mounting the file system as a trusted file system, the operation is denied in an example.

In some examples, the option to mount a file system as a trusted file system is also able to indicate one or more allowed access types for which data stored on its associated file system is authorized. In an example, the option to mount a file system as a trusted file system is able to indicate one or more of a number of different allowed access types, and data on the file system is only authorized for the types of allowed access that correspond to the settings specified by the option to mount a file system as a trusted file system. Examples of different allowed access types that are able to be indicated by the option to mount a file system as a trusted file system include, but are not limited to, accessing data defining kernel modules that are able to be loaded by the device, accessing data defining scripts to be executed by the device, executing binaries to be executed by the device, accessing the data as shared libraries to be used by the device, other types of accesses, or combinations of these.

In an example, the option to mount a file system as a trusted file system is able to indicate that data on its associated file system is able to contain kernel modules that can be loaded, but data on that file system is not authorized to contain scripts or shared libraries that are to be executed with elevated privileges. The option to mount a file system as a trusted file system could also indicate that data on the file system is able to contain executable binaries that can be executed with elevated privilege levels, but the data cannot contain scripts or kernel modules that will be accepted by the device. In some examples, the option to mount a file system as a trusted file system is able to indicate multiple states, and data on the associated file system is allowed to be accessed for any access type indicated by any state specified by the option to mount a file system as a trusted file system.

In one example, the option to mount a file system as a trusted file system for a file system or partition storing an identified file is checked when: a process running as a privileged user attempts to execute a new binary stored in the identified file, a process running as a privileged user attempts to load a shared library stored in the identified file, a process attempts to load a new kernel module contained in the identified file, a script interpreter stored on a trusted partition attempts to load and execute the script contained in the identified file, or combinations of these. These situations are provided as examples and are not limiting. Examples of a process running as a privileged user in this context include, but are not limited to:

1) An executing process associated with an account that has elevated privileges, such as a privileged user or an account with a group ID indicating an ability to execute with privileges. Examples of such processes are processes with a UID equal to 0 on POSIX based operating systems.

2) A file or process that is specified to have, for example, specific Linux capabilities enabled, including but not limited to CAP_CHOWN, CAP_DAC_OVERRIDE, CAP_DAC_READ_SEARCH, CAP_FOWNER, CAP_MAC_ADMIN, CAP_MAC_OVERRIDE, CAP_MKNOD, CAP_SETGID, CAP_SETUID, CAP_SYS_ADMIN, CAP_SYS_MODULE, CAP_SYS_PTRACE, and CAP_SYS_RAWIO. It is noted that in the following description capabilities such as these are included in the term privilege or elevated privilege.

3) A process running with any one of the defined SELinux contexts identified as privileged.

The above are examples only and are not limiting. In general, a particular device is able to define any condition, criteria, indications, other dependencies, or combinations of these in order to restrict the use of data stored in a particular data storage that is verified according to the techniques described herein.

FIG. 1 illustrates a computing environment 100, according to an example. The computing environment 100 depicts two electronic devices, a portable electronic device 102 and a computer 104. In general, these electronic devices are used by individuals to perform various functions. These electronic devices are examples of devices that include data storage used to store applications, user data, system data, other data, or combinations of these. The illustrated electronic devices are only examples used to illustrate certain relevant aspects in this description and are not limiting. In general, a large variety of any type of suitable electronic device is able to incorporate data storage and one or more processors that use data stored in the data storage to perform restricted operations within the device. It is to be understood that the systems and methods described herein are applicable to any computing device that restricts some operations.

The depicted electronic devices are shown to be able to perform electronic communications with each other and with other devices (not shown) via a communications network 114. The portable electronic device 102 is in wireless communications with a wireless base station 110 via a wireless link 112. A wireless base station 110 is depicted for ease of understanding and description, but is understood represent one or more wireless communications systems. Examples of communications system using a wireless base station 110 include long range wireless communications such as cellular communications systems, wide area wireless network systems, any other long range wireless communications system, or combinations of these. The wireless base station 110 is also able to include one or more shorter range wireless communications systems such as WiFi®, Bluetooth®, Near Field Communications (NFC), any other short range system, or combinations of these.

The wireless base station 110 and the computer 104 are connected to a communications network 114. Examples of the communications network 114 include, but are not limited to, the Internet, data communications networks connecting selected locations, any accessible network, any data communications network, or combinations of these. The computer 104 in the illustrated example is connected to the communications network 114 by a first link 116. The wireless base station 110 in the illustrated example is connected to the communications network by a second link 118. The use of a simple link in this illustration is for ease of understanding and explanation, but it is understood that electronic devices and wireless nodes, such as the computer 104, wireless base station 110, other devices, or combinations of these, are able to be connected to the communications network 114 by any suitable technique. Particular connections to the communications network is able to be via, for example, sub-networks that include one or more of wired connections or wireless connections.

Figure 2:
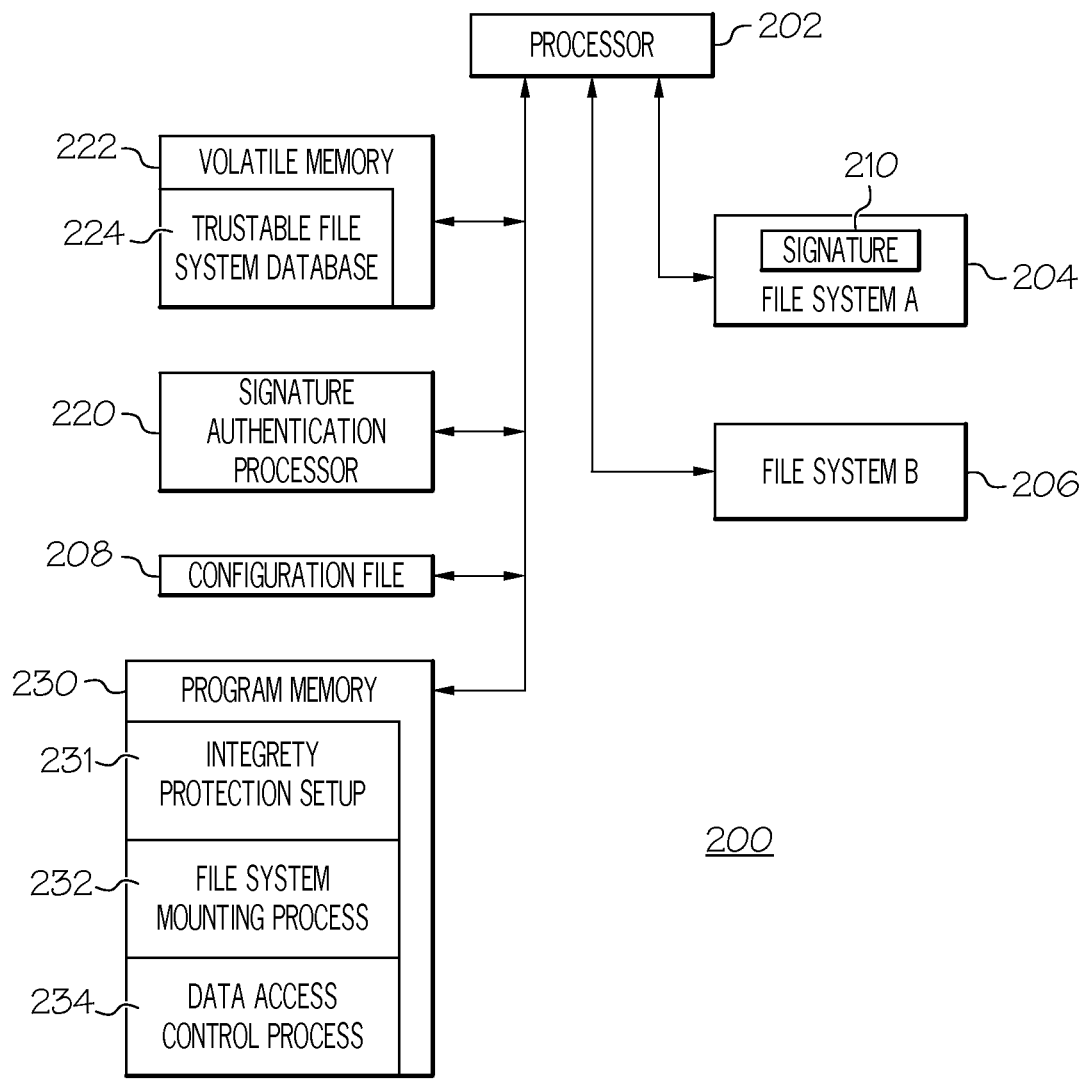
FIG. 2 illustrates an electronic device block diagram, according to an example.

FIG. 2 illustrates an electronic device block diagram 200, according to an example. The electronic device block diagram 200 includes a processor 202, a program memory 230, a volatile memory 222, a first file system 204, a second file system 206, a configuration file 208, and a signature authentication processor 220. The electronic device block diagram 200 is a simplified block diagram of any suitable electronic device that is able to execute applications, use data, perform other operations, or combinations of these, with data store in file storage.

In the illustrated example, the first file system 204 is a data storage that provides integrity protection. The first file system 204 includes a signature 210. In various examples, the signature 210 is able to be stored in any suitable location. For example, the signature 210 for a particular file system is able to be stored in that particular file system itself, in another location, or in combinations of these. In further examples, integrity protection is able to be provided by any suitable technique which may or may not include signature data or other data structures.

The first file system 204 in an example is used to store executable applications, store configuration data, store other data, or combinations of these. The executable applications, other data, or combinations of these, that are stored in the first file system 204 are able to be used to perform or support performing restricted operations requiring elevated privileges. In various examples, the first file system is also able to store executable applications, data, or combinations of these, that are not used in conjunction with any elevated privileges and for which verification would not necessarily be required. The integrity protection provided by the first file system 204 allows applications, data, or combinations of those, to be reliably identified, such as by access control labels also stored in the first file system 204, as able to be used in conjunction with elevated privileges.

The second file system 206 in this example does not provide data integrity protection and does not have a signature. In an example, the second file system is used to store data by the operation of this electronic device, such as data accumulated by the device, downloaded application, any other data, or combinations of these.

The electronic device block diagram 200 includes a configuration file 208. In an example, configuration file 208 stores configuration data for the electronic device that includes which file systems are to be mounted, and which file systems are to be mounted by a process with the trusted file system option specified. In some examples, the configuration file is able to include particular allowed access types that are to be specified when mounting a file system as a trusted file system, as is described in further detail below. The contents of the configuration file 208 and the use of those contents is described in further detail below.

The signature authentication processor 220 is used, for example, to verify signatures file systems that are attempted to be mounted as a trusted file system. The signature authentication processor 220 performs defined processing to, for example, verify the signature based on a public key of the originator of the data, determining that one or more hash values stored in the signature 210 of the first file system 204 matches hash values for the data currently stored in that file system, other operations, or combinations of these.

The volatile memory 222 in an example stores a trustable file system database 224. The trustable file system database 224, as is described below, includes data indicating successful verification of integrity protection for particular file systems. In an example, as described below, file system integrity is set up and verified for a particular file system when the file system is first encountered while the processor 202 is operating, such as during start up, system booting, when a device storing the file system is first connected or accessed by the processor 202 such as via an iSCSI or other connection, at other times, or during combinations of these. The trustable file system database 224 in an example has an entry identifying each file system for which integrity protection has been verified. In an example, the trustable file system database 224 is stored in volatile memory and this data is not retained during one or more events such as the device shutting down, rebooting, other events, or combinations of these. In an example, access to the volatile memory 222 storing the trustable file system database 224 is restricted to privileged operations associated with verifying integrity protection of storage devices and mounting trusted file systems.

The illustrated program memory 230 depicts software components used in the implementation of the below described processing examples. The program memory 230 is able to be any suitable program storage. The depicted program memory 230 stores data that define executable applications that include an integrity protection setup process 231, a file system mounting process 232 and a data access control process 234. In various examples, the program memory is able to store data defining any other programs that are executed by the processor 202.

The integrity protection setup process 231 is a process that in one example operates prior to mounting of a file system and verifies the integrity protection of a file system. In one example, the integrity protection setup process 231 sets the value for a file system in the trustable file system database 224 based on verification of the integrity protection of that file system. The file system mounting process 232 is a process that mounts a specified file system. In an example, the file system mounting process 232 supports specifying a trusted file system option, as is described in detail below, which causes the contents of the trustable file system database 224 to be examined prior to mounting the file system and conditioning the mounting of the file system based on that data.

The program memory further depicts a data access control process 234. The data access control process 234 in an example receives commands to access data in a file system. In some examples, the data access control process 234 receives commands to access integrity protected data, such as is described above as being stored on file system A 204. In an example, access to data on a file system for which integrity protection has been verified is conditioned on verifying that the file system was mounted with a command specifying mounting the file system as a trusted file system. In some examples, accessing data by a process executing with elevated privileges causes the data access control process 234 to verify that the file system storing requested data was mounted by a command specifying that the file system is mounted as a trusted file system. In some examples, the data access control process 234 is able to receive, along with a request to access data, a specification that the data is integrity protected data and that the integrity protection for that data is to be verified. Accessing data for which integrity protection is to be verified in some examples causes the data access control process 234 to verify that the requested data is stored on a file system that was mounted with a mounting command that specified the file system to be mounted as a trusted file system. As described above, a file system mounting command that specifies mounting the file system as a trusted file system conditions the mounting on the contents of the trustable file system database 224 for that file system, which reflects the verification of integrity protection for that file system. Based on verifying that the file system storing the requested data was mounted with a mounting command specifying that the file system is to be mounted as a trusted file system, the data access control process 234 either accesses the data or avoids access of the data, as is described in further detail below.

FIG. 3 illustrates a file system list 300, according to an example. The file system list 300 is an example of data stored within the configuration file 208 described above. In various examples, the configuration file 208 is able to store other types of information concerning the configuration of a particular device. The file system list 300 in an example specifies which file systems are able to be mounted by a device. In some examples, file systems listed in the file system list 300 are mounted at specific times, such as when a device first powers up, boot, reboots, when other events occur, or upon combinations of these events. In an example, some or all of the file systems listed in the file system list 300 are able to be automatically mounted when a device first starts or reboots. In some examples, commands to mount a particular file system while a device is operating examine the file system list 300 to determine options for mounting the particular file system.

The file system list 300 in the illustrated example is able to specify for each listed file system whether the trusted file system option is to be specified when that particular file system is to be mounted. The file system list 300 further depicts specifications of allowed access types for which particular file systems may be mounted. In an example, an indication that the trusted file system option is to be specified when a particular file system is to be mounted causes the mounting process to examine the contents of the trustable file system database 224 and to condition the mounting of the file system based on the contents of the examine the contents of the trustable file system database 224. File systems listed in the file system list 300 that are not specified to be mounted with the trusted file system option are generally able to be mounted normally. In an example, the mounting process does no checking of the contents of the trustable file system database 224 for file system that are mounted without the trusted file system option specified, and therefore labels or other indicia associated with files on those file systems should not be relied upon to grant access to, or allow the use of those files to support, execution at elevated privilege or capability levels. In some examples, processes operating with elevated privileges or capabilities are not allowed to access data stored on file systems that were mounted without the trusted file system option specified.

The file system list 300 has a number of rows with one row specifying information about a particular file system. The file system list 300 has a first row 310, which specifies information about "File System A," a second row 312, which specifies information about "File System B," and a second row 314, which specifies information about "File System C." The illustrated file system list 300 includes two columns, a file system name column 302, and a trusted file system option column 304. Each row of the file system name column 302 includes an identification of the file system associated with that row. The illustrated example indicates "File System A," File System B," and "File System C," respectively for ease of understanding and explanation. In various examples, the file system names are able to be any suitable identifier understood by a processor to identify the file system.

The trusted file system option column 304 of the illustrated file system list 300 has a respective entry to indicate if the file system in that row is to be mounted by a process with the trusted file system option specified. In the illustrated example, the trusted file system option column 304 further specifies allowed access types that are to be specified in the trusted file system option. In the illustrated example, the first row 310 specifies "file system A" 320 as the file system name, and the value of "all" 322 in the trusted file system option column 304. The value of "all" 322 in the file system option column 304 indicates that the trusted file system option is to be specified by the mounting command, and that all access types are to be allowed. The second row 312 specifies "file system B" 330 as the file system name, and the value of "none" 332 in the trusted file system option column 304. The value of "none" 332 in the file system option column 304 in this example indicates that the trusted file system option is not to be specified by the mounting command. The third row 316 specifies "file system C" 340 as the file system name, and the value of a "list of allowed operations" 342 specified in the trusted file system option column 304. The "list of allowed operations" 342 in some examples is a list of allowed access types that are allowed for the particular mounted file system, such as allowing data on the file system to be used as kernel modules, as scripts to be executed with elevated privileges, any other access type, or combinations of these. The "list of allowed operations" 342 in the file system option column 304 indicates that the trusted file system option is to be specified by the mounting command, and that the listed access types are to be allowed. In an example, accessing data by processes executing with elevated privileges will proceed for "file system A" and "file system C" if they are successfully mounted because those file systems are specified to be mounted with the trusted file system option. Accessing data stored on "file system B" by processing executing with elevated privileges in one example will be denied because it was not mounted with the trusted file system option.

The illustrated file system list 300 has a trusted file option column 304 that specifies allowed access types to be permitted for data on the file system. In further examples, the trusted file system option column 304 is able to specify Boolean values such as true/false, yes/no, or other similar entries. Specifying a Boolean value of "true" or its equivalent in one example is similar to specifying "all" and allows the data on the file system to be used for any purpose subject to other operating system constraints. Specifying a Boolean value of "false" or its equivalent causes the file mounting command to not specify the trusted file system option.

The illustrated file system list 300 depicts a trusted file system option column 304, in some examples a file system list is able to allow a number of mounting options to be specified for the file system associated with that line. In some examples, options such as an option "ro" specifying the file system is to be mounted as read-only, the option "rw" specifying that the file system is to be mounted as read/write, other options that specify certain operating characteristics for the file system, or combinations of these. In these examples, the available list of options is also able to include an option such as "trusted" that specifies the trusted file system option is to be specified when the file system is mounted.

Figure 4:
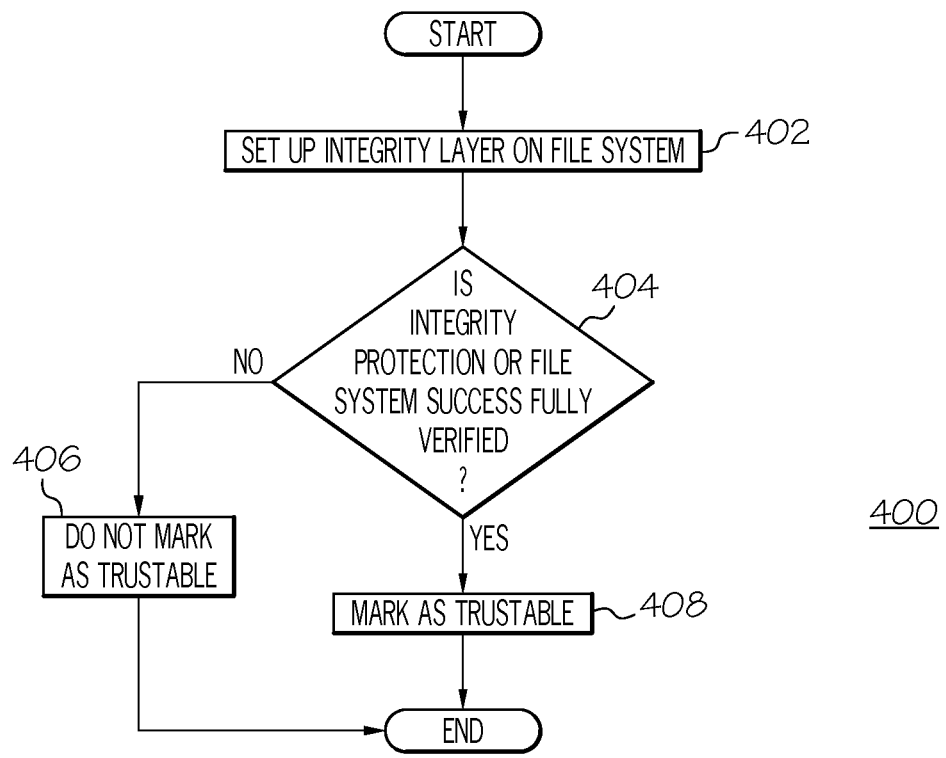
FIG. 4 illustrates a file system integrity protection setup process, according to an example.

FIG. 4. Illustrates a file system integrity protection setup process 400, according to one example. The file system integrity protection set up process 400 is an example of an integrity protection setup process 231, described above. A processor 202 executing the file system integrity protection setup process 400 is an example of an integrity protection verification processor.

The file system integrity protection setup process 400 in an example is executed when a file system is first encountered after a processor starts operating, such as during a device start up process, a booting process, when a file system is first encountered such as when a device is connected to an already operating processor, first connected via an iSCSI connection during execution, at other times, or at combinations of these. The file system integrity protection set up process 400 in an example is executed after the processor starts execution and the data stored by the file system integrity protection set up process 400 is not retained after one or more events that include, but are not limited to, the processor stops or shuts down, the device resets or otherwise stops operating, other events, or combinations of these.

In general, the file system integrity protection set up process 400 is able to be executed at any time. Not executing the file system integrity protection set up process 400 prior to a request to mount a file system with the trusted file system option specified in some examples will cause the mount request to be denied. In general, the file system integrity protection set up process 400 is executed prior to mount requests for a file system that specifies the trusted file system option.

The file system integrity protection set up process 400 begins by setting up, at 402, file system integrity layer, at 402. In an example, the file system integrity layer is set up by a system, such as dm-verity, that verifies stored hash values with hash values of data currently stored in the file system, as is described above. In some examples, file system integrity is able to be provided by any technique, such as by the operation of the file system itself, by other processing, or combinations of these.

A determination is then made, at 404, if the integrity protection on the file system is successfully verified. If the integrity protection is successfully verified, that file system is marked, at 408, as trustable. In an example, the particular file system is marked as trustable by placing an entry into the trustable file system database 224 described above. If the integrity protection is not successfully verified, the file system is not marked as trustable, at 406. In an example, a particular file system is not marked as trustable by merely not placing an entry for that particular file system into the trustable file system database 224. In further examples, not marking the particular file system as trustable is able to include storing other indicators associated with the particular file system to reflect that the integrity protection of that particular file system was not successfully verified. The file system integrity protection set up process 400 then ends.

Figure 5:
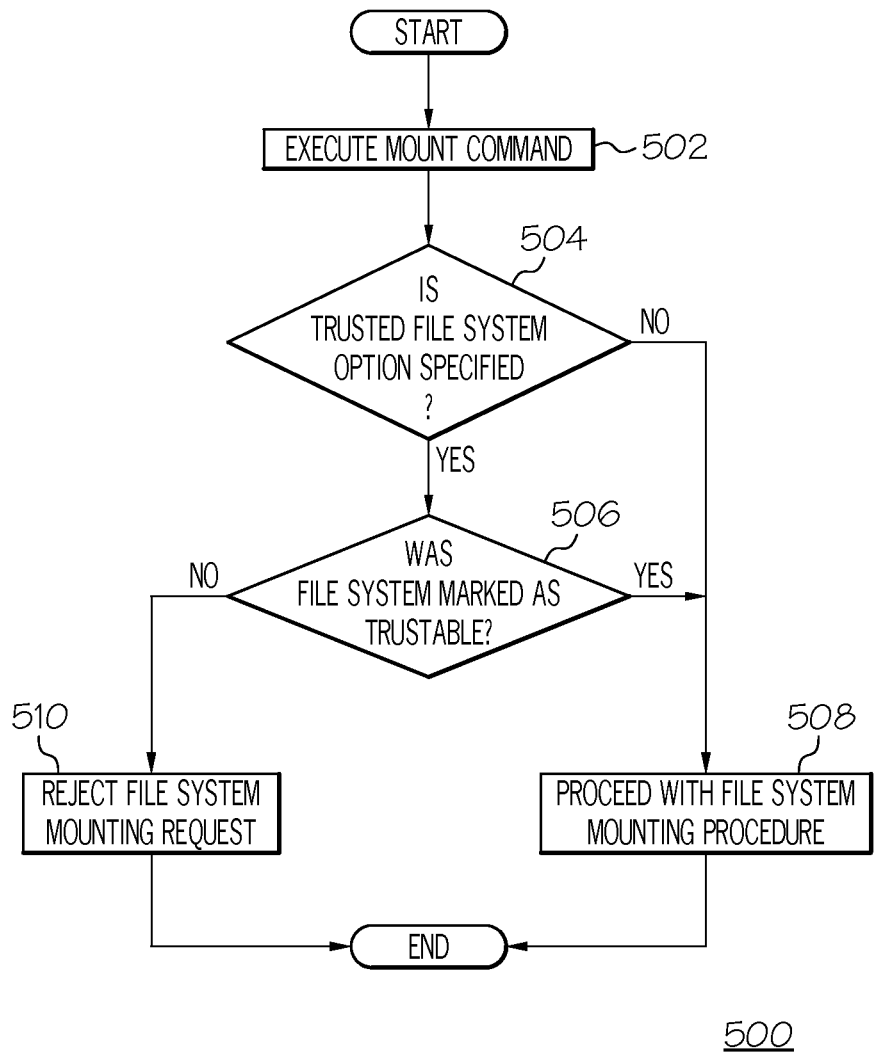
FIG. 5 illustrates a file system mounting process, according to an example.

FIG. 5. Illustrates a file system mounting process 500, according to one example. The file system mounting process 500 is an example of a file system mounting process, such as is defined by the file system mounting process 232 described above, that is able to have an option specified that the file system is to be mounted as a "trusted" file system. A processor 202 executing the file system mounting process 500 is an example of a file mounting processor. The file system mounting processing 500 determines if the trusted file system mounting option was specified, determines if the specified file system has been marked as a trustable file system, and proceeds with the mounting process or rejects the mounting request based on determination that the file system was marked as a trustable file system.

The file system mounting process 500 begins by executing, at 502, a command to mount a particular file system. In various examples, a file system mounting command is able to be executed based upon an automatic configuration specifying mounting of a file system upon start up or reboot of a device, based on receiving a command to mount the file system while the device is operating, based on any event, or based on combinations of these.

The file system mounting process 500 determines, at 504, if the trusted file system option is specified for the file system to be mounted. The trusted file system option is able to be specified in any suitable manner. For example, a file system mounting command is able to be executed with a command option specifying that the file system is to be mounted as a trusted file system. In various examples, the option specifying that the file system is to be mounted as a trusted file system is able to be specified as a Boolean value, or the option is able to specify one or more types of allowed accesses that are to be allowed for the mounted file system.

If it is determined, at 504, that the trusted file system option is not specified, the file system mounting process 500 proceeds with the file system mounting procedure, at 508. In this example, the file system is not mounted as a trusted file system because the option to do so was not specified. The file system mounting procedure 508 in an example is a conventional file system mounting procedure that is subject to various conditions and privileges. The file system mounting process 500 then ends.

Returning to determining, at 504, if the trusted file system option is specified, a determination is made, at 506, as to whether the specified file system is marked as a trustable file system. In an example, this determination is based on determining that the specified file system has an indication in the trustable file system database 224. If the file system is not determined to be marked as a trustable file system, the file system mounting process 500 in one example rejects the file system mounting request, at 510. In other examples, the other actions are able to be taken, such as mounting the specified file system as though the trusted file system option was not specified.

Returning to determining, at 506, if it is determined that the specified file system is marked as a trustable file system, such as by having an entry in the trustable file system database 224 described above, the file system mounting process 500 in one example mounts the file system, at 508. In an example, the mount options used to mount the file system are stored and can be later examined to determine if the file system was mounted with the trusted file system option specified. The file system mounting process 500 then ends.

Figure 6:
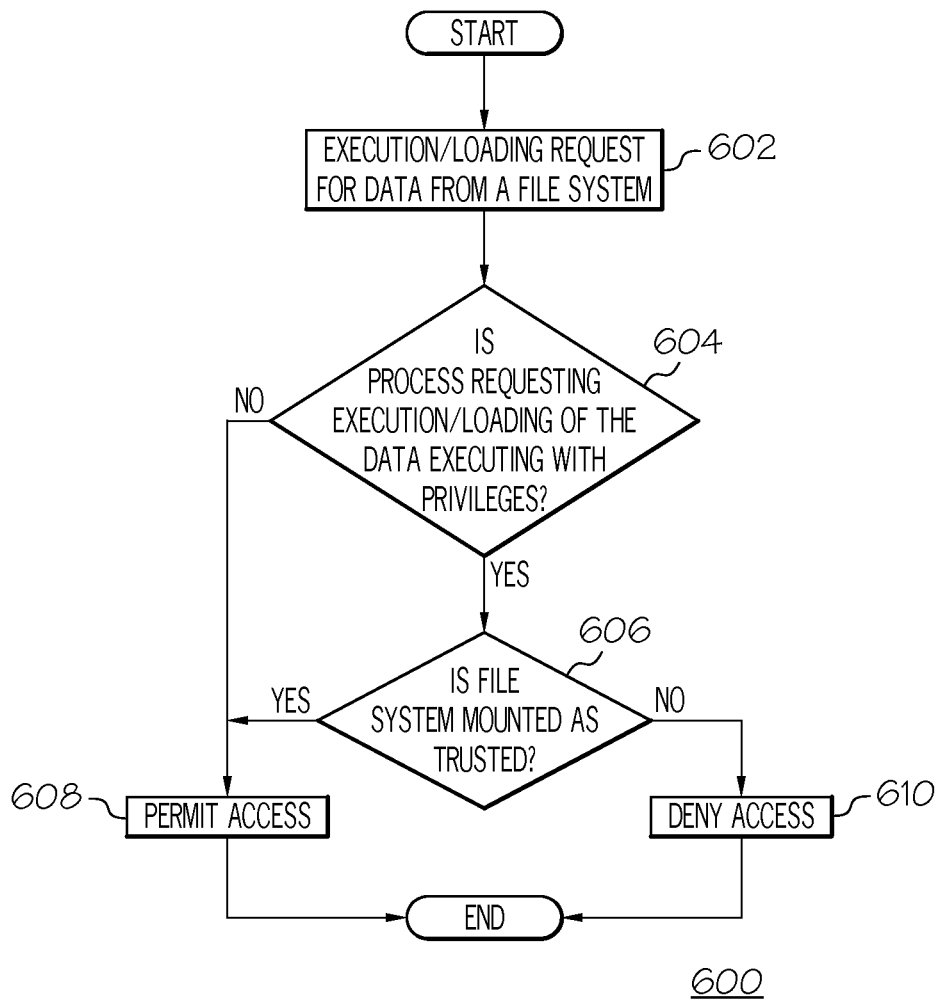
FIG. 6 illustrates a data access process, according to an example.

FIG. 6 illustrates a data access process 600, according to an example. The data access process 600 is an example of a process, such as the data access control process 234 described above, that is able to be performed by any process, including processes with or without elevated privileges, to ensure that data to be accessed by a process with elevated privileges is stored in a file system that was mounted with the trusted file system option. A processor 202 executing the data access process 600 is an example of a data access control processor. In one example, a similar process is able to be made available to any process via a user space Application Program Interface (API) which conditions accessing the data based on whether the file system was mounted as a trusted file system.

The data access process 600 in an example is executed whenever a request is received to access data. In addition to retrieving data stored on the file system, further examples of accessing such data include, but are not limited to, executing a process, application, executable procedure, any processing, or combinations of these, at elevated privileges levels, with certain capabilities, with an ability relative to any restrictions, or combinations of these. The data access process 600 in an example verifies that the requested data, which in an example is able to define a process, other executable object, or data, is stored on a file system that was mounted with a mounting command that specified the trusted file system option. As discussed above, a file system that was successfully mounted with a command specifying the trusted file system option has had its integrity protection verified. This verifying of the integrity protection for the file system storing the requested data enhances the trust that that the data, and therefore the application or other data, has not been modified.

The data access process 600 begins by receiving, at 602, a request to access data, such as to execute or load the data, from a file system. Requests to access data are able to be in any form. In some examples, any process is able to request access data by using a special Application Program Interface (API) that performs the below described verifications.

The data access process 600 proceeds to determine, at 604, if the process requesting to execute or load the data is executing with elevated privileges. If the process in not executing with elevated privileges, the access is permitted, at 608. In some examples, accessing data is able to also be conditioned upon other restrictions, such as operating system privileges and access rights, other conditions, or combinations of these.

If it is determined that the process requesting access to the data is operating with elevated privileges, a determination is made, at 606, as to whether the file system on which the requested data is stored was mounted with a command that specified the file system to be mounted as a trusted file system. Whether or not a file system was mounted by a command specifying that the file system is to be mounted as a trusted file system is able to be determined by any suitable technique. For example, the operating system is able to store the options used to mount a particular file system, and those stored options are able to be examined to determine if the file system was mounted with the trusted file system option.

If it is determined, at 606, that the file system was mounted with the trusted file system option, access to the requested data is permitted, at 608. In some examples, access to the requested data is conditioned upon other restrictions, such as operating system privileges and access rights, other conditions, or combinations of these.

If it is determined, however, at 606 that the file system storing the requested data was not mounted with the trusted file system option, the data access process 600 denies the access, at 610. In various examples, denying the access to the requested data is able to include, but is not limited to, not accessing the data at all, accessing the data but providing a notification to the requesting process that the integrity protection of that data has not been verified, returning an indication that the data is no longer trusted because its integrity protection cannot be verified, performing other operations other than would be performed if the integrity protection were verified, or combinations of these. After proceeding with permitting the access, or after denying the access, the data access process 600 then ends.

As described above, the mounting option to specify mounting the file system as a trusted file system is also able to include specifications of at least one allowed access type that are authorized for that file system. In further examples, the command to mount the file system is able to specify multiple allowed access types. In such examples, the determination, at 606, as to whether the file system is mounted as a trusted file system is also able to determine a requested access type corresponding to the requested access, and if the file system was mounted with an option specifying that the file system is to be mounted as a trusted file system with an allowed access type corresponding to the requested access type for this data. If the file system was mounted as a trusted file system and the requested access type was specified when the file system was mounted as a trusted file system, the access is permitted, at 608. If the file system was not mounted as a trusted file system, or if the file system was mounted as a trusted file system but where the requested access type does not correspond to an allowed access type specified when the file system was mounted, the access is denied, at 608.

Figure 7:
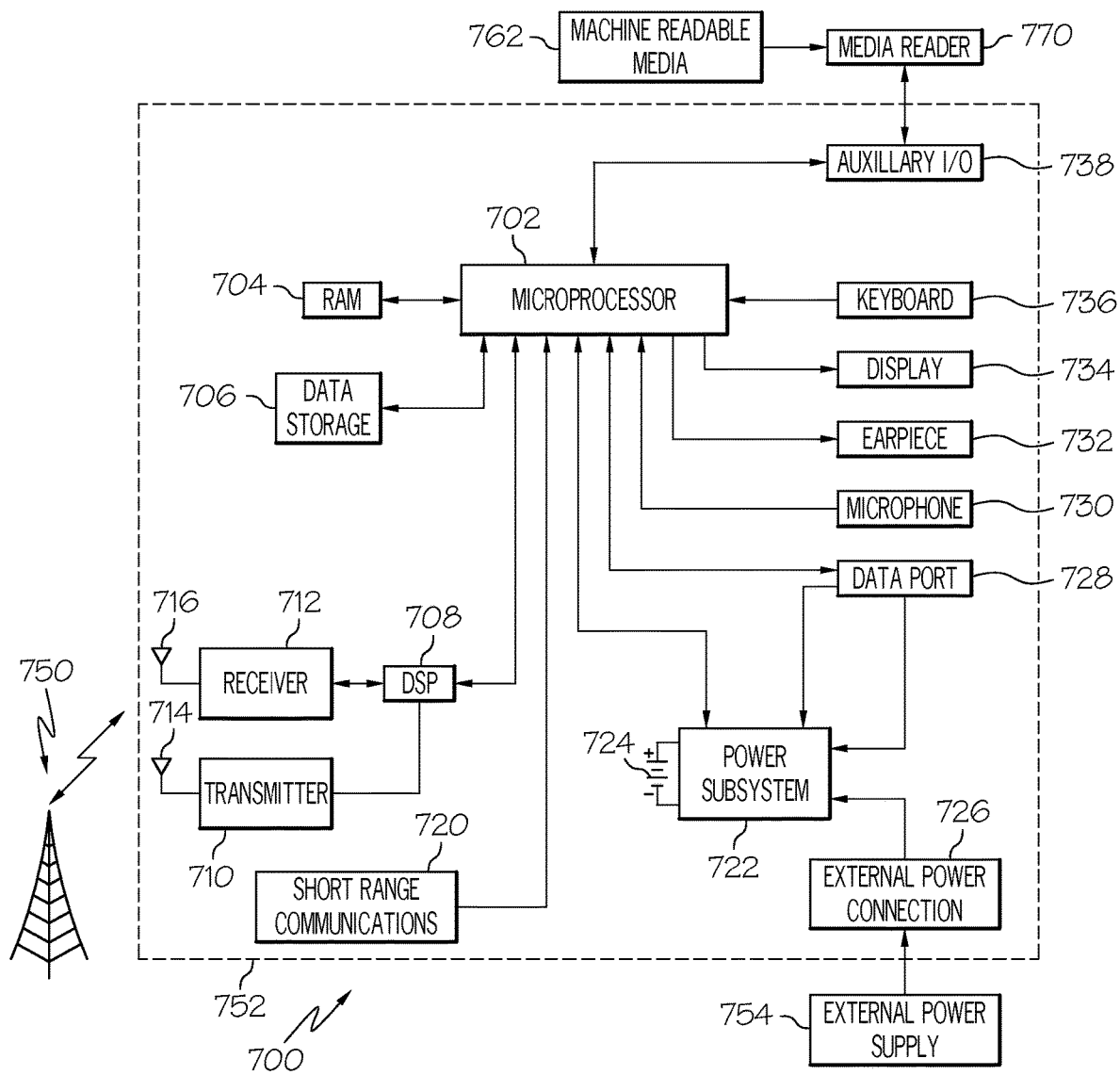
FIG. 7 is a block diagram of an electronic device and associated components in which the systems and methods disclosed herein may be implemented.

FIG. 7 is a block diagram of an electronic device and associated components 700 in which the systems and methods disclosed herein may be implemented. In various examples, the electronic device 752 is able to be an example of the above described portable electronic device 102, which is an example of a wireless two-way communication device with voice, text chat, and data communication capabilities. Such electronic devices communicate with a wireless voice, text chat, or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 752 is an example electronic device that includes two-way wireless communications functions. Such electronic devices incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems. In various examples, the electronic device 752 is able to include one or more of various components such as a data storage 706, random access memory (RAM) 704, auxiliary input/output (I/O) device 738, data port 728, display 734, keyboard 736, earpiece 732, audio sound reproduction system 770, microphone 730, a short-range communications subsystem 720, a power subsystem 722, other subsystems, or combinations of these.

One or more power storage or supply elements, such as a battery 724, are connected to a power subsystem 722 to provide power to the circuits of the electronic device 752. The power subsystem 722 includes power distribution circuitry for providing power to the electronic device 752 and also contains battery charging circuitry to manage recharging the battery 724 (or circuitry to replenish power to another power storage element). The power subsystem 722 receives electrical power from external power supply 754. The power subsystem 722 is able to be connected to the external power supply 754 through a dedicated external power connector (not shown) or through power connections within the data port 728. The power subsystem 722 includes a battery monitoring circuit that is operable to provide a status of one or more battery status indicators, such as remaining capacity, temperature, voltage, electrical current consumption, and the like, to various components of the electronic device 752.

The data port 728 is able to support data communications between the electronic device 752 and other devices through various modes of data communications, such as high speed data transfers over an optical communications circuits. Data port 728 is able to support communications with, for example, an external computer or other device. In some examples, the data port 728 is able to include electrical power connections to provide externally provided electrical power to the electronic device 752, deliver electrical power from the electronic device 752 to other externally connected devices, or both. Data port 728 of, for example, an electronic accessory is able to provide power to an electronic circuit, such as microprocessor 702, and support exchanging data between the microprocessor 702 and a remote electronic device that is connected through the data port 728.

Data communication through data port 728 enables a user to set preferences through the external device or through a software application and extends the capabilities of the device by enabling information or software exchange through direct connections between the electronic device 752 and external data sources rather than via a wireless data communication network. In addition to data communication, the data port 728 provides power to the power subsystem 722 to charge the battery 724 or to supply power to the electronic circuits, such as microprocessor 702, of the electronic device 752.

Operating system software used by the microprocessor 702 is stored in data storage 706. Examples of data storage 706 are able to include, for example, flash memory, magnetic based storage devices, other volatile or non-volatile data store elements, or the like. The data storage 706 is an example is able to include the above described program memory 230. The data storage 706 in an example is able to include file systems, such as file system A 204 discussed above, that provide integrity protection. Some examples are able to use data storage 706 that includes a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704. The microprocessor 702 in some examples includes a component, such as is able to be defined in data storage 706 in one example, that include the processes described above that are stored in the program memory 230.

The microprocessor 702, in addition to its operating system functions, is able to execute software applications on the electronic device 752. A set of applications that control basic device operations, including at least data and voice communication applications, is able to be installed on the electronic device 752 during manufacture. In an example, programs and other data used to support the processes described above are able to be installed in the memory of the electronic device 752. Further examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 752 through, for example, the wireless network 750, an auxiliary I/O device 738, Data port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data. In some examples, the electronic device 752 includes a display, output ports, or combinations of these. In such examples, the received data is able to be processed for output to the display 734, or alternatively, to an auxiliary I/O device 738 or the Data port 728. In examples of the electronic device 752 that include a keyboard 736 or other similar input facilities, a user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to an earpiece 732 and signals for transmission are generally produced by a microphone 730. Alternative voice or audio I/O subsystems, such as a voice message recording subsystem, may also be implemented on the electronic device 752. Although voice or audio signal output is generally accomplished primarily through the earpiece 732, in examples of electronic devices 752 that include a display 734, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 720 provides for data communication between the electronic device 752 and different systems or devices, which need not necessarily be similar devices. For example, the short-range communications subsystem 720 includes an infrared device and associated circuits and components or a Radio Frequency based communication module such as one supporting Bluetooth® communications, to provide for communication with similarly-enabled systems and devices, including the data file transfer communications described above. The short-range communications subsystem is also able to include one or more of components to support communications over wireless links such as Wi-Fi®, Near Field Communications (NFC), any other short range link, or combinations of these A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the Data port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
maintaining a set of trustable file system indicators;
verifying, prior to receiving a command to mount a specified file system within at least one file system, integrity protection for the at least one file system based on determining that a system performing the integrity protection is operating on the at least one file system and indicates that that the integrity of the file system is being maintained;

storing, prior to receiving the command to mount the at least one file system and based on the verifying integrity protection for the specified file system within the at least one file system, a respective trustable file system indicator associated with the specified file system within the set of trustable file system indicators;

receiving, on a processor subsequent to storing the respective trustable file system indicator, the command to mount the specified file system, wherein the command indicates that the specified file system is to be mounted as a trusted file system;

determining, based on the receiving the command to mount a specified file system, that the respective trustable file system indicator associated with the specified file system within the set of trustable file system indicators indicates that the specified file system is marked as a trustable file system, the specified file system being marked as a trustable file system; and mounting, based on receiving the command and based on determining that the specified file system is marked as a trustable file system, the specified file system as a trusted file system.

2. The method of claim 1, further comprising:

receiving a command to access data on the specified file system;

determining, based on receiving the command to access data, that the command to mount the specified file system specified mounting the specified file system as a trusted file system;

accessing the data based on determining that the command to mount specified mounting as a trusted file system; and avoiding access of the data based on determining that the command to mount did not specify mounting as a trusted file system.

3. The method of claim 2, where the command to access data comprises a command to execute a process with an elevated privilege, where the process is defined by the data.

4. The method of claim 2, where the command to access data comprises a command to retrieve the data.

5. The method of claim 1, wherein the set of trustable file system indicators comprises a respective trustable file system indicator that is associated with each respective file system for which integrity protection has been verified, the respective trustable file system indicator reflecting marking of its associated file system as a trustable file system.

6. The method of claim 1, further comprising:

determining, from among a plurality of file systems, the specified file system as a file system to mount as a trusted file system; and initiating, based on determining the specified file system, the command to mount the specified file system as a trusted file system.

7. The method of claim 6, further comprising storing configuration data for a plurality of file systems, the plurality of file systems comprising the specified file system, and wherein the determining the specified file system is based on the configuration data.

8. The method of claim 1, wherein the verifying is performed prior to mounting the specified file system and while the specified file system is not mounted.

9. The method of claim 1, wherein the verifying is performed during a boot process of the system performing integrity protection.

10. The method of claim 1, wherein the verifying is performed prior to mounting the specified file system and at a time when the specified file system is first presented to the system performing the integrity protection.

11. A device, comprising:

a processor;

a memory coupled to the processor;

a data storage, coupled to the processor, the data storage comprising at least one file system; and a file system mounting processor that when operating:

maintain a set of trustable file system indicators;

verify, prior to receiving a command to mount a specified file system within at least one file system, integrity protection for the at least one file system based on determining that a system performing the integrity protection is operating on the at least one file system and indicates that that the integrity of the file system is being maintained;

store, prior to receiving the command to mount the at least one file system and based on verification of integrity protection for the specified file system within the at least one file system, a respective trustable file system indicator associated with the specified file system within the set of trustable file system indicators;

receives, subsequent to storing the respective trustable file system indicator, the command to mount the specified file system, wherein the command indicates that the specified file system is to be mounted as a trusted file system;

determines, based on receiving the command to mount a specified file system, that the respective trustable file system indicator associated with the specified file system within the set of trustable file system indicators indicates that the specified file system is marked as a trustable file system, the specified file system being marked as a trustable file system; and mounts, based on receiving the command and based on determining that the specified file system is marked as a trustable file system, the specified file system as a trusted file system.

12. The device of claim 11, further comprising a data access control processor that when operating:

receives a command to access data on the specified file system;

determines, based on the receiving the command to access data, that the command to mount the specified file system specified mounting the specified file system as a trusted file system;

accesses the data based on determining that the command to mount specified mounting as a trusted file system; and avoids access of the data based on determining that the command to mount did not specify mounting as a trusted file system.

13. The device of claim 12, where the command to access integrity protected data comprises a command to execute a process with an elevated privilege, where the process is defined by the integrity protected data.

14. The device of claim 12, where the command to access integrity protected data comprises a command to retrieve the integrity protected data.

15. The device of claim 12, wherein the command to mount the specified file system further specifies at least one allowed access type from within a plurality of access types, each allowed access type within the plurality of access types indicating an access type authorized for data on the specified file system, and where the file system mounting processor, when operating:
- determines a requested access type corresponding to the command to access the data, and
- wherein access to the data is further based on the requested access type corresponding to one of the at least one allowed access type.

16. The device of claim 15, wherein the command to mount the specified file system specifies a plurality of allowed access types, and
- wherein access to the data is further based on the requested access type corresponding to an allowed access type within the plurality of allowed access types.

17. The device of claim 11, where the set of trustable file system indicators comprises a respective trustable file system indicator for each respective associated file system for which integrity protection has been verified, the respective trustable file system indicator reflecting marking of its associated file system as a trustable file system.

18. The device of claim 11, wherein the set of trustable file system indicators is stored in volatile memory.

19. A non-transitory computer readable storage medium having computer readable program code embodied therewith, the computer readable program code comprising instructions executable by a processor to:
- maintain a set of trustable file system indicators;
- verify, prior to receiving a command to mount a specified file system within at least one file system, integrity protection for the at least one file system based on determining that a system performing the integrity protection is operating on the at least one file system and indicates that that the integrity of the file system is being maintained;
- store, prior to receiving the command to mount the at least one file system and based on verification of integrity protection for the specified file system within the at least one file system, a respective trustable file system indicator associated with the specified file system within the set of trustable file system indicators;
- receive, subsequent to storing the respective trustable file system indicator, the command to mount the specified file system, wherein the command indicates that the specified file system is to be mounted as a trusted file system;
- determine, based on receiving the command to mount a specified file system, that the respective trustable file system indicator associated with the specified file system within the set of trustable file system indicators indicates that the specified file system is marked as a trustable file system, the specified file system being marked as a trustable file system;
- mount, based on receiving the command and based on determining that the specified file system is marked as a trustable file system, the specified file system as a trusted file system;
- receive a command to access data on the specified file system;
- determine, based on the receiving the command to access data, that the command to mount the specified file system specified mounting as a trusted file system;
- access the data based on determining that the command to mount specified mounting as a trusted file system; and
- avoid access of the data based on determining that the command to mount did not specify mounting as a trusted file system.

20. The non-transitory computer readable storage medium of claim 19, wherein the command to mount the specified file system further specifies at least one allowed access type from within a plurality of access types, each allowed access type within the plurality of access types indicating an access type authorized for data on the specified file system, and wherein the computer readable program code further comprises instructions executable by a processor to:
- determine a requested access type corresponding to the command to access the data, and
- wherein access to the data is further based on the requested access type corresponding to one of the at least one allowed access type.

\* \* \* \* \*